United States Patent [19]

Cooney et al.

[11] Patent Number: 5,106,518
[45] Date of Patent: Apr. 21, 1992

[54] BREAKER SYSTEM FOR HIGH VISCOSITY FLUIDS AND METHOD OF USE

[75] Inventors: Aidan P. Cooney; D. V. Satyanarayana Gupta, both of The Woodlands, Tex.

[73] Assignee: The Western Company of North America, Houston, Tex.

[21] Appl. No.: 611,995

[22] Filed: Nov. 9, 1990

[51] Int. Cl.⁵ .............................................. E21B 43/26
[52] U.S. Cl. .................................. 252/8.551; 252/8.553; 252/358; 166/305.1; 166/308
[58] Field of Search .................. 252/8.551, 8.553, 358; 166/308, 305.1

[56] References Cited

U.S. PATENT DOCUMENTS

| | | | |
|---|---|---|---|
| 3,002,960 | 10/1961 | Kolodny | 166/305.1 X |
| 3,058,909 | 10/1962 | Kern | 252/8.551 |
| 3,301,723 | 1/1967 | Chrisp | 252/315.3 X |
| 3,509,113 | 4/1970 | Monagle | 166/305.1 X |
| 3,727,688 | 4/1973 | Clampitt | 166/308 X |
| 3,779,914 | 12/1973 | Nimerick | 252/8.551 |
| 3,827,898 | 8/1974 | Podias | 252/8.551 |
| 3,888,312 | 6/1975 | Tiner et al. | 166/308 |
| 3,960,736 | 6/1976 | Free | 252/8.551 |
| 3,974,077 | 8/1976 | Free | 252/8.551 |
| 4,021,355 | 5/1977 | Holtmyer et al. | 252/8.551 |
| 4,144,179 | 3/1974 | Chatterji | 252/8.551 |
| 4,202,795 | 5/1980 | Burnham et al. | 166/308 X |
| 4,250,044 | 2/1981 | Hinkel | 252/8.551 |
| 4,463,810 | 8/1984 | Hill | 166/308 |
| 4,514,309 | 4/1985 | Wadhwa | 252/8.551 |
| 4,552,675 | 11/1985 | Brown et al. | 252/8.551 |
| 4,560,486 | 12/1985 | Hinkel | 252/8.551 |
| 4,610,795 | 9/1986 | Norris et al. | 252/8.551 |
| 4,619,776 | 10/1986 | Mondshine | 252/8.551 |
| 4,686,052 | 8/1987 | Baranet et al. | 252/8.551 |
| 4,692,254 | 9/1987 | Kucera | 252/8.551 |
| 4,969,526 | 11/1990 | Cawiezel | 166/308 X |

Primary Examiner—Robert L. Stoll
Assistant Examiner—Chhaya Sayala
Attorney, Agent, or Firm—Pravel, Gambrell, Hewitt, Kimball & Krieger

[57] ABSTRACT

A breaker system for treating subterranean formations and method of use wherein the breaker comprises (i) a diethanolamine and (ii) at least one oxidizing compound selected from the group of ammonium persulfate, alkali metal persulfates, percarbonates and perborates and the breaker system comprises borate crosslinked gels in the ambient temperature range.

21 Claims, No Drawings

BREAKER SYSTEM FOR HIGH VISCOSITY FLUIDS AND METHOD OF USE

BACKGROUND OF THE INVENTION

This invention relates to a breaker system for high viscosity fluids and method of use. More particularly this invention relates to a breaker system for high viscosity fluids and a method of use in treating subterranean formations. Most particularly, this invention relates to a secondary amine breaker system and method of use in fracturing subterranean formations.

Fluids exhibit a measurable property known as viscosity, a term which may be broadly defined as the internal friction or molecular attraction of a given material which manifests itself in resistance to flow. It is measured in liquids by standard test procedures and is usually expressed in poises or centipoises at a specified temperature, although in oil technology it is sometimes expressed in seconds required for a given volume to flow through a specified orifice at a definite temperature. The viscosity of a fluid is an indication of a number of behavior patterns of the liquid at a given temperature including pumping characteristics, rate of flow, wetting properties, and a tendency or capacity to suspend an insoluble particulate material.

There are a number of industrial operations wherein it is desirable to employ viscous aqueous solutions. A very commonly employed viscous aqueous solution is a "water-based fluid" which generally comprises an aqueous fluid of water, brine, seawater, etc., that contains a thickening agent or viscosity builder. When the viscous water-based fluid contains a cross-linked viscosity builder, it is known as a crosslinked water gel. For example, they are employed to fracture subterranean formations penetrated by a borehole for increasing the production of petroleum fluids, namely crude oil and natural gas. Viscous aqueous solutions are also employed in the secondary recovery of oil from oil bearing subterranean formations by fluid drive processes. There are many drilling fluids that are based upon viscous aqueous liquids. Viscous aqueous solutions are also used as carrier fluids in sand control operations such as emplacement of a gravel pack or consolidated gravel pack, and the like, particularly where low fluid loss and/or particulate transport properties are desired. Viscous aqueous fluids are also employed to transport solids through pipelines and the like.

In all of these processes it is often times desirable to control the viscosity of the viscous aqueous solution. Generally, it is desired to reduce or "break" the viscosity of the fluid after a period of time. The reduction of the viscosity of a liquid results in a corresponding reduction in the capacity of that liquid to suspend particulate material, resulting in the dropping out or settling out of the particulate materials suspended in the fluid.

For example, in fracturing a subterranean formation, a fracturing fluid (usually a liquid, although some gas may be present), having granular insolvable particulate material suspended or slurried therein, is injected down a well penetrating the formation and forced back in the formation (employing the height of the hydraulic head of the liquid to provide pressure and hence is commonly known as hydraulic fracturing). Through the instrumentality of such operation, the formation is caused to crack or fracture thereby effectuating improved communication between a fluid (oil, gas, water, etc.) in the formation and the well. Fracturing is customarily conducted by employing oil, water, (sometimes in a thickened or gelled state) or an emulsion thereof which has suspended therein, particles which are substantially insoluble in the liquid and the fluids of the formation, at least a portion of the particles thereby being forced to lodge in the fractures created, thus propping open the fractures when the fracturing pressures are subsequently released and the well put back in production.

To maintain a propping agent suspended in a liquid unit until it is lodged in a fracture presents problems since the propping agent tends to settle out as the rate of movement of the liquid, after leaving the wellbore, slackens. This sometimes occurs prematurely resulting in depositing the propping agent in the wellbore or immediately adjacent to the wellbore, causing what is known as a sand-out or a screen-out. In efforts to avoid the premature deposition of the propping agent, liquids have been used, the suspending ability of which is improved by thickening the same with a suspending agent (a viscosity increasing agent). This approach to the problem, though aiding and maintaining the propping agent suspension for additional time, introduces the added problem of tending to prevent the propping agent from lodging securely in the newly created fractures and to prevent the removal of the fracturing liquid from the fractures. It would be desirable to "break" the viscosity of the fracturing fluid with a "breaker" to reduce the capacity of the fracturing fluid to maintain the propping agents in suspension. Breaker generally refers to chemical additives to viscous water-based fluids which will reduce the viscosity of the fluid after a delayed period of time.

The use of "breakers" to reduce the viscosity of aqueous gelled treating fluids is not new and has heretofore been accomplished using a variety of techniques such as by the degradative action of acids, enzymes, or mild oxidizing agents. However, many of the prior art breakers were limited to temperatures of at least 100° F., and generally were only effective on certain specific aqueous solutions. The lack of utility of the prior art breakers at lower temperatures meant that the breakers were frequently less than satisfactory for application to the special case of relatively low temperature oil and gas reservoirs (defined as from about 50° to about 125° F.). For example, as the gelling agent or viscosity builder concentration is increased, the water gel or fracturing fluid requires extended times to effect a complete break. The delay caused by the inability to affect a rapid and complete break under relatively cool reservoir conditions, disadvantageously extends the well clean-up time, i.e. retraction of water gel or fracturing fluid from the wellbore, and in some cases inhibits the satisfactory clean up operation. Consequently the art has tended to favor modified techniques which are designed using light viscosity fracturing fluids to circumvent or partially circumvent the unsuitable nature of the more viscous, more frequently cross-linked gels or fluids. Such modified techniques produce the undesirable result of a lowering of the permissible proppant concentration, coupled with the need for substantially increased pumping rates. Recent studies have shown that the importance of high total proppant volume in good stimulation treatments and the importance of controlling pumping rates for good fracture high control.

In an effort to overcome the limitations of the prior art breakers, it was asserted that the breaker disclosed in U.S. Pat. No. 4,560,486 and U.S. Pat. No. 4,250,044, would promote the reduction of the viscosity of viscous water based fluids maintained at temperatures within the range from about 50° F. to about 125° F., wherein the fluid comprised a polysaccharide thickening agent, and as a breaker a persulfate plus a tertiary amine. However, the breaker disclosed in the '044 patent and '486 patent was recognized as not being able to break certain cross-linked gels without the addition of a suitable base to adjust the pH to within a critical necessary range, because many times with crosslinked water gels the crosslinking is reversible if the fluid is adjusted to an acid pH.

It is therefore an object of the present invention to provide a breaker that is able to effect a complete break of a cross-linked gel in a relatively low temperature of oil and gas recevoir without the addition of a base to adjust the pH within a critical range.

SUMMARY OF THE INVENTION

According to one embodiment of the present invention there is provided a treatment fluid for treating a subterranean formation penetrated by a borehole, wherein the static temperature of the borehole adjacent the formation is within the range from about 50° F. to about 125° F., comprising: (a) an aqueous liquid; (b) as a thickening agent to increase the viscosity of the aqueous liquid, a viscosity increasing amount of a polysaccharide which is soluble or dispersible in the aqueous liquid; and, (c) as a breaker to reduce the viscosity of the fluid an effective amount of (i) diethanolamine and (ii) at least one oxidizing compound selected from the group consisting of ammonium persulfates, alkali metal persulfates, percarbonates and perborates in at least partially water soluble form.

According to another embodiment of the present invention there is provided a method of treating a subterranean formation penetrated by a borehole, wherein the static temperature of the borehole adjacent to the formation is within the range of from about 50° F. to about 125° F., comprising: injecting into the borehole and into contact with the formation, a water-based fluid comprising: (a) an aqueous liquid; (b) as a thickening agent to increase the viscosity of the aqueous liquid a viscosity increasing amount of a polysaccharide which is soluble or dispersible in the aqueous liquid; and, (c) as a breaker to reduce the viscosity of the fluid an affective amount of (i) diethanolamine and (ii) at least one oxidizing compound selected from the group consisting of ammonium persulfates, alkali metal persulfates, percarbonates and perborates in at least partially water soluble form.

According to yet another embodiment of the present invention there is provided a method of fracturing a subterranean formation penetrated by a borehole, wherein the static temperature of the borehole adjacent said formation is within the range of from about 50° F. to about 125° F. comprising: injecting into the borehole and into contact with the formation at a rate and pressure sufficient to fracture said formation, a water-based fluid comprising: (a) an aqueous liquid; (b) as a thickening agent to increase the viscosity of the aqueous liquid a viscosity increasing amount of a polysaccharide which is soluble or dispersible in the aqueous liquid; and, (c) as a breaker to reduce the viscosity of the fluid an affective amount of (i) diethanolamine and (ii) at least one compound selected from the group consisting of ammonium persulfates and alkali metal persulfates in at least partially water soluble form.

According to yet another embodiment of the present invention there is provided a method for reducing the viscosity of the viscous water-based fluid at temperatures of from about 50° F. to about 125° F., comprising contacting the water-based fluid with a breaker which comprises an effective amount (i) diethanolamine and (ii) at least one oxidizing compound selected from the group consisting of ammonium persulfates, alkali metal persulfates, percarbonates and perborates and at least partially water soluble form.

DESCRIPTION OF THE INVENTION

The breaker of the present invention comprises an effective amount of (i) diethanolamine and (ii) at least one oxidizing compound selected from the group consisting of ammonium persulfates, alkyl metal persulfates, percarbonates and perborates in at least partially water soluble form. Neither the diethanolamine, persulfate, percarbonate or perborate is effective, if utilized alone, in the temperature range embraced by the present invention, with the persulfate alone showing what is characterized as essentially no practical activity in the ambient temperature range, and inefficient activity at the upper part of the range, i.e. 125° F..

The aqueous medium employed in the water-based fluid or water gel may be about any kind of water from any source including for example fresh water, sea water, water from the reservoir, a natural or synthetic brine or seawater.

The viscosity builder or thickening agent or gelling agent used within the scope of the invention is based on the addition of a polysaccharide to the aqueous medium. Polysaccharides which may be employed in the practice of the present invention include natural occurring polysaccharides which are dispersible in cold or hot water to produce viscous solutions. Also included are polysaccharides in water-soluble or water-swellable forms, which are the derivatives or modifications of natural occurring polysaccharides, e.g., celluloses and various gums, which in their natural form are substantially insoluble in water.

One group of polysaccharides which is within the scope of the invention are the industrial gums such as those generally classified as exudate gums, seaweed gums, seed gums, microbial polysaccharides; and hemicelluloses (cell wall polysaccharides found in land plants) other than cellulose and pectins. Included by way of specific example are xylan, mannan, galactan, L-arabino-xylans, L-arabino-D-glucorono-D-xylans; 40-methyl-D-glucurono-D-xylans, D-gluco-D-mannans; D-galacto-D-mannans and arabino-D-galactans, algin, such as sodium alginate, carrageenin, fucordan, laminaran, agar gum, arabic gum, ghatti gum, karaya gum, tamarind gum, tragacanth gum, guar gum, locust bean gums and the like. Modified gums such as carboxyalkyl derivatives (e.g. carboxymethyl guar and hydroxyalkyl derivatives, e.g. hydroxypropyl guar) can also be employed. Modified celluloses and derivatives thereof can also be employed. There are thus literally thousands of such materials which have varying properties that can be employed in the practice of the present invention, for example, cellulose ethers, esters and the like.

Most preferably the polysaccharide gel will be cross-linked with a borate crosslinker. Borate was one of the earliest crosslinkers utilized in the production of oil and gas and is well known in the art.

It is well understood that a minimum pH in the range of about 7.5 to about 8.5 is required for a borate crosslinked gel to have appropriate properties for hydraulic fracturing or gravel packing.

In addition the present invention also is helpful in high pH crosslinked titanium, zirconium and other metal crosslinked gels by eliminating the need for pH adjusters or buffers.

In general, any of the water-soluble cellulose ethers can be used in the practice of the invention. Those cellulose ethers which can be used include, among others, the various carboxyalkyl cellulose ethers, e.g. carboxyethyl cellulose and carboxymethyl cellulose (CMC); mixed ethers such as carboxyalkyl ethers, e.g. carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Most preferred polysaccharides are the galactomannans, modified or derivative galactomannans, and modified cellulose derivatives, examples of which are given supra.

The chemistry and materials involved in the preparation of polysaccharide water-based fluids and water gels of the type above specified is well understood in the art. Representative teachings incorporated by reference into this specification, in this respect, include U.S. Pat. Nos. 2,767,167; 3,058,909; 3,634,237; 3,727,688; 3,766,984; 3,779,914; 3,960,736; and 3,974,077. The '077 patent, for example, teaches a preferred mode of preparing crosslinked, polysaccharide water-gels of especially useful properties for use in the fluid or hydraulic oil and gas well fracturing methods contemplated by the invention. Alternately, the invention may employ non-crosslinked fluids.

As is well understood, the amount of thickening agent employed in the aqueous solution depends on the desired working viscosity of the solution. Since with very high viscosity fluids, it is difficult to reliably and meanfully quantitate viscosity, especially as applies to high viscosity water-gels, the requirements are best expressed in terms of concentration of the thickening agent. Thus depending on the application, generally from about 10 to about 100 pounds of the thickening agent per 1000 gallons of aqueous solution is employed (about 2.4 to about 12 kg/m$^3$). About 40–60 pounds thickening agent per 1000 gallons fluid (4.8–7.2 kg/m$^3$) is most preferable for the improved fracturing fluids contemplated by the invention.

The amount of breaker employed is that amount required to reduce the viscosity of a given water-based fluid at a temperature within from about 50° F. (about 10° C.) to about 125° F. (about 50° C.), to a preselected lower viscosity or to a "complete break", as most desired, within a desired period of time. The optimum or effective amount of breaker employed depends on factors such as the induction period desired, diethanolamine solubility factor, the particular thickening or gelling agent and its concentration, the particular breaker combination, the formation temperature as well as other factors. Thus, the nature of the invention does not lend itself to a precise statement of a sharply defined operable concentration range for the breaker combination. Typically, however, from about 0.1 gal. to about 5 gallons of liquid amine is employed per 1000 gallons of fluid (about 0.1–5 l/kl). For solids, the typical operational amine concentration is corresponding from about 1 to about 40 pounds of amine per 1000 gallons of fluid (about 0.12–4.8 kg/kl). The upper limit in each case, is determined principally by economic factors. Most preferably, the amine is present at a concentration of from about 0.5 to about 2 gallons per 1000 gallons (about 0.5–2 l/kl), or as expressed for solids, from about 4 to about 16 pounds per 1000 gallons (about 0.48–1.9 kg/kl).

The corresponding amount of persulfate present, while not subject to a precise statement, and depending on the similar factors expressed above, will, however, typically be satisfactorily employed within the range of about 0.25 to about 20 pounds per 1000 gallons of fluid (about 0.03–2.4 kg/kl). Most preferably, a persulfate concentration from about 0.5 to about 10 pounds per 1000 gallons (0.06–1.2 kg/kl) is suitably employed to obtain satisfactory breaks within the general temperature and time limitations imposed by fracturing applications. The diethanolamine, in the typical applications contemplated, is preferably used in proportions of about 2 to 6 mols for each mol of persulfate, again the optimum proportion depending on the conditions of a specified application, and thus not ruling out possible exceptions applicable to the recited range.

EXAMPLES

Breaker tests were run using normal procedures, and temperatures were maintained in a thermostatically controlled water bath.

Viscosity was measured at temperature at 80° F. (after cooling) using a FANN 35A viscometer at 511 S$^{-1}$.

TABLE 1

| Amine (neat) 2 gal/1000 gal | pH | 100° Break Time Hours |
|---|---|---|
| Monoethanolamine | 9.8 | >8 |
| Hexamethylenetetramine | 6.83 | >8 |
| Triethanolamine (TEA) | 8.1 | <2 |
| Triethylamine | 10.0 | 3.5 |
| Tris Amino 40% | 8.5 | 4 |
| Phenethylamine | 10.0 | >8 |
| AMP 95% (2-amino-2-methyl-1-propanol) | 10.5 | >8 |
| AEPD 85% (2-amino-2-ethyl-1,3-propanediol) | 9.5 | >8 |
| Diethanolamine (DEA) | 9.3 | 3 |

For TABLE 1, the gel used was 40 lb./1000 gal. hydrated hydroxypropyl guar at a starting pH of 7.0. The gel is treated with the various amines as shown in the table and 10 lbs./1000 gal. ammonium persulfate is kept in a closed environment (bottles) and maintained at 100° F.. At various times, a set of bottles are opened and viscosity measured at 511s$^{-1}$ at both 100° F. and 80° F.. The time at which the viscosity at 80° F. drops to less than 10 cp is the complete break and is shown in TABLE 1 as "Break Time."

TABLE II

| Loading #/1000 gal ammonium persulphate | (50% TEA) = 2 gal/1000 gal pH (Initial) | (50% DEA) = 2 gal/1000 gal pH (Initial) |
|---|---|---|
| 0 | 9.21 | 10.14 |
| 1 | 8.94 | 9.82 |
| 2 | 8.83 | 9.62 |
| 5 | 8.65 | 9.35 |
| 7 | 8.56 | 9.23 |
| 9 | 8.50 | 9.4 |

TABLE II-continued

| Loading #/1000 gal ammonium persulphate | (50% TEA) = 2 gal/1000 gal pH (Initial) | (50% DEA) = 2 gal/1000 gal pH (Initial) |
|---|---|---|
| 14 | 8.38 | 9.00 |

What is Claimed:

1. A treatment fluid for treating a subterranean formation penetrated by a bore hole, wherein the static temperature of the bore hole adjacent the formation is within the range from about 50° F. to about 125° F., comprising (a) an aqueous liquid; (b) as a thickening agent to increase the viscosity of the aqueous liquid, a viscosity increasing amount of a borate crosslinked polysaccharide which is soluble or disbursable in the aqueous liquid; and, (c) as a breaker to reduce the viscosity of the fluid an effective amount of (i) diethanolamine and (ii) at least one oxidizing compound selected from the group consisting of ammonium persulfates, alkaline metal persulfates, percarbonates and perborates in at least partially water soluble form.

2. The treatment fluid of claim 1 wherein the fluid contains per 1000 gallons of fluid, in the range of about 20 to about 100 pounds of thickening agent, in the range of about 0.1 to about 5 gallons of diethanolamine, if liquid, and if solid, in the range of about 1 to about 40 pounds, and from about 0.25 to about 20 pounds of persulfate.

3. The treatment fluid of claim 2 wherein the breaker is present in an amount effective to promote a complete break of the fluid in less than about 8 hours 4. The treatment fluid of claim 3 wherein the thickening agent is selected from the class consisting of galactomannans, modified and derivative galactomannans and cellulose derivatives.

5. The treatment fluid of claim 4 wherein the thickening agent is a guar or hydroxypropylguar.

6. The treatment fluid of claim 5 wherein the breaker is ammonium persulfate.

7. A method of treating a subterranean formation penetrated by a borehole, wherein the static temperature of the borehole adjacent to the formation is within the range of from about 50° F. to about 125° F., comprising: injecting into the borehole and into contact with the formation, a water-based treatment fluid comprising: (a) an aqueous liquid; (b) as a thickening agent to increase the viscosity of the aqueous liquid a viscosity increasing amount of a borate crosslinked polysaccharide which is soluble or disbursible in the aqueous liquid; and, (c) as a breaker to reduce the viscosity of the fluid an effective amount of (i) diethanolamine and (ii) at least one oxidizing compound selected from the group consisting of ammonium persulfates, alkali metal persulfates, percarbonates and perborates in at least partially water soluble form.

8. The method of claim 7 wherein the breaker is present in an amount effective to promote a complete break of the fluid in less than about 8 hours following the introduction of the last component of the breaker into the fluid.

9. The method of claim 8 wherein the thickening agent is selected from the class consisting of galactomannans, modified and derivative galactomannans and cellulose derivatives.

10. The method of claim 9 wherein the thickening agent is a guar or hydroxypropylguar.

11. The treatment fluid of claim 10 wherein the breaker is ammonium persulfate.

12. A method of fracturing a subterranean formation penetrated by a borehole, wherein the static temperature of the borehole adjacent said formation is within the range of from about 50° F. to about 125° F. comprising: injecting into the borehole and into contact with the formation at a rate and pressure sufficient to fracture said formation, a water-based fracturing fluid comprising: (a) an aqueous liquid; (b) as a thickening agent to increase the viscosity of the aqueous liquid a viscosity increasing amount of a borate crosslinked polysaccharide which is soluble or disbursable in the aqueous liquid; and, (c) as a breaker to reduce the viscosity of the fluid an effective amount of (i) diethanolamine and (ii) at least one oxidizing compound selected from the group consisting of ammonium persulfates, alkali metal persulfates, percarbonates and perborates in at least partially water soluble form.

13. The method of claim 12 wherein the breaker is present in an amount effective to promote a complete break of the fluid in less than about 8 hours following the introduction of the last component of the breaker into the fluid 14. The method of claim 13 wherein the thickening agent is selected from the class consisting of galactomannans, modified and derivative galactomannans and cellulose derivatives.

15. The method of claim 14 wherein the thickening agent is a guar or hydroxypropylguar.

16. The method of claim 15 wherein the breaker is ammonium persulfate.

17. A method for reducing the viscosity of a viscous borate crosslinked water-based fluid at temperatures of from about 50° F. to about 125° F., comprising contacting the water-based fluid with a breaker which comprises an effective amount (i) diethanolamine and (ii) at least one oxidizing compound selected from the group consisting of ammonium persulfate, and alkali metal persulfates, percarbonates and perborates in at least partially water soluble form.

18. The method of treatment of claim 17 wherein the breaker is present in an amount effective to promote a complete break of the fluid in less than about 8 hours following the introduction of the last component of the breaker into the fluid.

19. The method of claim 18 wherein the thickening agent is selected from the class consisting of galactomannans, modified and derivative galactomannans and cellulose derivatives.

20. The method of claim 19 wherein the thickening agent is a guar or hydroxypropylguar.

21. The method of claim 20 wherein the breaker is ammonium persulfate.

* * * * *